(12) United States Patent
Septien Prieto et al.

(10) Patent No.: US 11,622,554 B2
(45) Date of Patent: Apr. 11, 2023

(54) INTEGRAL BIRD ANTI-MIGRATION PANEL

(71) Applicants: Francisco Javier Septien Prieto, Guanajuato (MX); Jose Ramon Septien Dussan, Guanajuato (MX); Leticia Dussan Garcia, Guanajuato (MX); Sebastian Septien Dussan, Guanajuato (MX)

(72) Inventors: Francisco Javier Septien Prieto, Guanajuato (MX); Jose Ramon Septien Dussan, Guanajuato (MX); Leticia Dussan Garcia, Guanajuato (MX); Sebastian Septien Dussan, Guanajuato (MX)

( * ) Notice: Subject to any disclaimer, the term of this patent is extended or adjusted under 35 U.S.C. 154(b) by 0 days.

(21) Appl. No.: 17/499,900

(22) Filed: Oct. 13, 2021

(65) Prior Publication Data
US 2022/0272962 A1 Sep. 1, 2022

(51) Int. Cl.
*A01M 29/32* (2011.01)
*A01K 45/00* (2006.01)

(52) U.S. Cl.
CPC .............. *A01M 29/32* (2013.01); *A01K 45/00* (2013.01)

(58) Field of Classification Search
CPC ...... A01K 1/0029; A01K 31/18; A01K 31/06; A01K 45/00; E01F 9/654; A01M 29/32; E04D 13/004
USPC ................... 52/101; 256/26, 27, 31; D25/45
See application file for complete search history.

(56) References Cited

U.S. PATENT DOCUMENTS

| | | | | |
|---|---|---|---|---|
| 3,795,073 | A * | 3/1974 | Olsen | A01K 69/10 43/100 |
| 5,039,250 | A * | 8/1991 | Janz | E01F 7/02 405/15 |
| D357,771 | S * | 4/1995 | Townsend, III | 256/11 |
| 6,616,383 | B2 * | 9/2003 | Janz | E02B 8/02 405/21 |
| D485,598 | S * | 1/2004 | Wanser | D22/119 |
| 7,762,746 | B2 * | 7/2010 | Berenyi | E01F 7/025 405/15 |
| 8,256,985 | B2 * | 9/2012 | Ashmead | E01F 13/02 404/6 |
| D691,737 | S | 10/2013 | Kokenge | |
| 9,788,531 | B2 | 10/2017 | Kokenge | |
| 10,458,146 | B2 * | 10/2019 | Masserant | E01F 13/028 |

(Continued)

*Primary Examiner* — Brent W Herring
(74) *Attorney, Agent, or Firm* — Hoglund & Pamias, PSC; Roberto J. Rios (57) ABSTRACT

An integral bird anti-migration panel is provided, which is conformed by a plurality of arches in a stepped pyramidal shape, spaced apart equidistantly from each other; a plurality of crossbars integrally joined to the sides of said plurality of arches to form a single element, wherein the union of said arches and crossbars form reticles of different dimensions, wherein the reticle of smaller dimension is located at the bottom of said panel and is designed to prevent small birds from entering inside said panel, and wherein the upper crossbar is ondulated to prevent the perching or resting of the birds thereon; and wherein the union of the lower crossbar and the lower ends of the arches forms a support base for the anti-migration panel; and wherein said lower cross member comprises a plurality of projections, which are configured to be buried in the ground and prevent the anti-migration panel from moving out of place.

8 Claims, 7 Drawing Sheets

(56) References Cited

U.S. PATENT DOCUMENTS

2008/0279639 A1\* 11/2008 Woudenbert .......... E02D 17/202
　　　　　　　　　　　　　　　　　　　　　　405/302.6

\* cited by examiner

INTEGRAL BIRD ANTI-MIGRATION PANEL

TECHNICAL FIELD OF THE INVENTION

The present invention is addressed to the technical field of poultry farms for broilers and other poultry. Likewise, the present application relates to anti-migration barriers and, more particularly, anti-migration barriers to provide spacing and confinement of animal groups.

BACKGROUND OF THE INVENTION

As is well known in the prior of the art, commercial poultry farming is mainly focused on the commercialization of broiler chicken to produce meat and the exploitation of the laying hen to produce egg for dish. Commercial poultry farming is an important livestock activity, since 60% of the animal protein production consumed by humans in the world, comes from broiler chicken meat and egg for dish comming from laying hens.

In particular, we will refer to the exploitation of broiler chicken for meat production. In this sense, nowadays, the premises to produce broiler chicken, depending on the level of technification, can be considered 3 main types: conventional-type production premises, which require labor since most of the equipment is manual; technified production premises where various equipment and automated systems including ventilation and cooling systems are installed; and finally semi-closed or closed production premises with a high level of technification where all of the systems are automated and there are a large number of sensors which provide information via real time.

Anti-migration barriers are very useful in any type of premise production because; confine the birds to preserve the density of the number of birds per drinker and feeder and avoid excessive mobility of the birds in conventional premises and in case of technified production premises and production premises with a high level of technification, besides avoiding mobility also prevents the migration of birds from one end of the house to the other end of the house, since their nature is to walk against the current of the air, which means that the birds will try to go to the end where the entrances of air are located so there will be a greater disproportion of birds as they approach to the air intake area.

The problem of the great mobility of birds has a great detrimental effect on the productivity of birds since the balanced feed consumed is not used by the bird to produce meat but also to be used in the energy expenditure that means the physical expenditure when move. It is for this reason that confinement is important. In the same way, the migration problem causes the lost of determined density of equipment, mainly the number of birds per feeder and the number of birds per automatic nipple-type drinkers.

Likewise, the phenomenon of migration causes that there are too many birds competing to eat and drink in certain areas, which causes a significant deterioration in the birds productivity. In some areas the birds will not be able to eat due to the excess of birds, when in other areas there will be very few birds and there will be many free sources of food. In addition, in the places where the birds are concentrated, much more heat is generated by these birds, so the problem of heat stress that occurs can cause the death of the birds by suffocation and not being able to disperse the heat generated internally.

The birds when they are small have very fine false feathers, but after two weeks they already have a coat of true and thick feathers which increases the need to keep cool.

Heat stress is the main problem for birds given that birds by being in high temperature environmental conditions, do not want to generate heat, so they stop eating to avoid generating more heat and even die if the temperature is very high.

According to the previous, in a technified production premise or production facilities with a high degree of technification, the installed equipment is: automatic feeder and drinker that are installed in several lines longitudinally; heating system, ventilation and cooling system, insulation system, weighing system, among others. The anti-migratory barriers are placed transversally in a number of 3 to 8 anti-migratory barriers per production site, and having as their main functions: confining the birds in homogeneous batches; controlling mobility, avoiding bird migration and caloric stress.

In this sense, it is stated that in the prior art there are solid panels, which are totally solid and can be wooden planks, metal sheets or corrugated tubes that are placed transversely in the production premise. These panels have the following disadvantages:

They are expensive materials

Its useful life is very short

Difficulty to be joined, assembled, handled and stored.

They are solid so they prevent the passage of air, that is, they have a total deflection of the air, thus, the birds do not receive the current of air so important to refresh or cool them.

The materials suffer from the inclemency inside the shed due to the action of humidity and ammonia; wood twists and rots; metal sheets rust; corrugated pipes have a short useful life.

They are heavy and difficult to handle.

Metal bases are used to keep them standing.

In the area where the automatic feeders and drinkers pass, they will have to be cut, which is a complicated task.

The handmade panels, where their manufacture is homemade and handmade since different materials are used. Example: wooden frames, tube frames, PVC frames so the frames are solid. A checkered mesh is placed either metal, nylon or plastic. It is required a lot of labor to manufacture it. The joining of the mesh to the frames is by means of thread that rots or wire that rusts, breaks easily and ends up cutting and damaging the bird.

These panels have the following disadvantages:

Metal bases are used to keep them standing.

This type of panel has the following disadvantages.

Excess of labor.

High manufacturing cost

Long manufacturing time

Excessive weight

In the area of automatic feeders and nipple drinkers, cuts are made which leaves wounding parts exposed, which causes damage to the skin and eyes of the animals.

The wire to join the meshes rusts and ends up breaking with which the loose wires are multiple cutting tips affecting and cutting eye area, necks, wings, breasts, legs and loins.

Short shelf life

The panels in the form of a leaf and others of inverted V; sheet-shaped panels refer to single-sheet welded metal panels requiring metal bases to keep them standing. Inverted V-shaped or A-shaped panels do not require metal bases. These panels are already obsolete today. These inverted V-shaped panels, depending on their design, are designed to form barriers, but they are joined so that one panel is placed over one another. This form of union wastes area which requires the use of more panels for a given area.

In this sense, there are the documents U.S. Pat. No. 9,788,531B2 and U.S. D691737, which disclose panels in the form of an inverted V or A, which present the following problems or disadvantages:

Metal and welded panels.

Metal panels are made of a plurality of wires which, due to the action of humidity and ammonia, rust and separate, causing the loose wires to provoque injuries to the birds.

Panels are not made in one piece.

They pollute the environment as they produce rust which is toxic to animals.

Panels difficult to transport due to their size and shape.

Heavy panels

It is formed by vertical and horizontal rods, but does not have reticles or squares. The spaces do not vary across the length and height of the panel so very small chickens can access into the panel.

Difficult to wash and disinfect since it has corners in all joints.

The A-shaped panels are designed to form barriers, but are joined so that one panel is placed over one another. The main disadvantages are:

Solid plastic panels with little reticulation or poor number of air spaces.

High deflection, so that the air does not pass through but passes over the heads of the animals without cooling or refreshing them.

Panels that are joined by superimposing one on top of the other, which requires a greater number of panels per width of the production premise.

Panels are easily damaged by the action of moisture and ammonia.

Panels are heavy and difficult to handle and store.

Water, ammonia, and humidity affect them quickly, so the useful life is short.

Panels are difficult to transport due to their size and shape

Therefore, there is a need for an anti-migratory barrier to be placed in poultry or other animal production premises to lot or create various pens in a transverse or longitudinal manner in order to create homogeneous batches and obtain various benefits.

OBJECTS OF THE INVENTION

It is therefore an object of the present invention to provide an integral bird anti-migration panel that maintains homogeneous groups between batches so that the birds have the same number of feeders and drinkers.

Another object of the invention is to provide an integral bird anti-migration panel that confines the birds as much as possible.

A further object of the present invention is to provide an integral bird anti-migration panel which is integrally formed of a material resistant to oxidation and/or corrosion.

Yet another object of the present invention is to provide an integral bird anti-migration panel that prevents the migration of birds of different sizes.

Still a further object of the invention is to provide an integral bird anti-migration panel that is easy to wash.

Yet another object of the present invention is to provide an integral bird anti-migration panel that prevents perching of birds. Perching means the action of holding, standing, and resting at the highest point.

BRIEF DESCRIPTION OF THE INVENTION

These and other objects are achieved through an integral bird anti-migration panel, which is conformed by a plurality of arches in a stepped pyramidal shape, spaced apart equidistantly from each other; a plurality of crossbars integrally joined to the sides of said plurality of arches to form a single element, wherein the union of said arches and crossbars form reticles of different dimensions, wherein the reticle of smaller dimension is located at the bottom of said panel and is designed to prevent small birds from entering inside said panel, and wherein the upper crossbar is ondulated to prevent the perching or resting of the birds thereon; and wherein the union of the lower crossbar and the lower ends of the arches forms a support base for the anti-migration panel; and wherein said lower cross member comprises a plurality of projections, which are configured to be buried in the ground and prevent the anti-migration panel from moving out of place.

The additional features and advantages of the invention should be more clearly understood by the detailed description of the preferred embodiment thereof, given by means of a non-limiting example with reference to the accompanying drawings, in which:

DETAILED DESCRIPTION OF THE INVENTION

Referring now to FIGS. 1-6, the preferred embodiment of the integral bird anti-migration panel of the present invention is shown, generally numbered at 1000. Said integral anti-migration panel 1000 is generally conformed by a plurality of arches 1100 having a stepped pyramidal shape; a plurality of crossbars 1200, and reticles 1300 of different dimensions.

Figure 1:
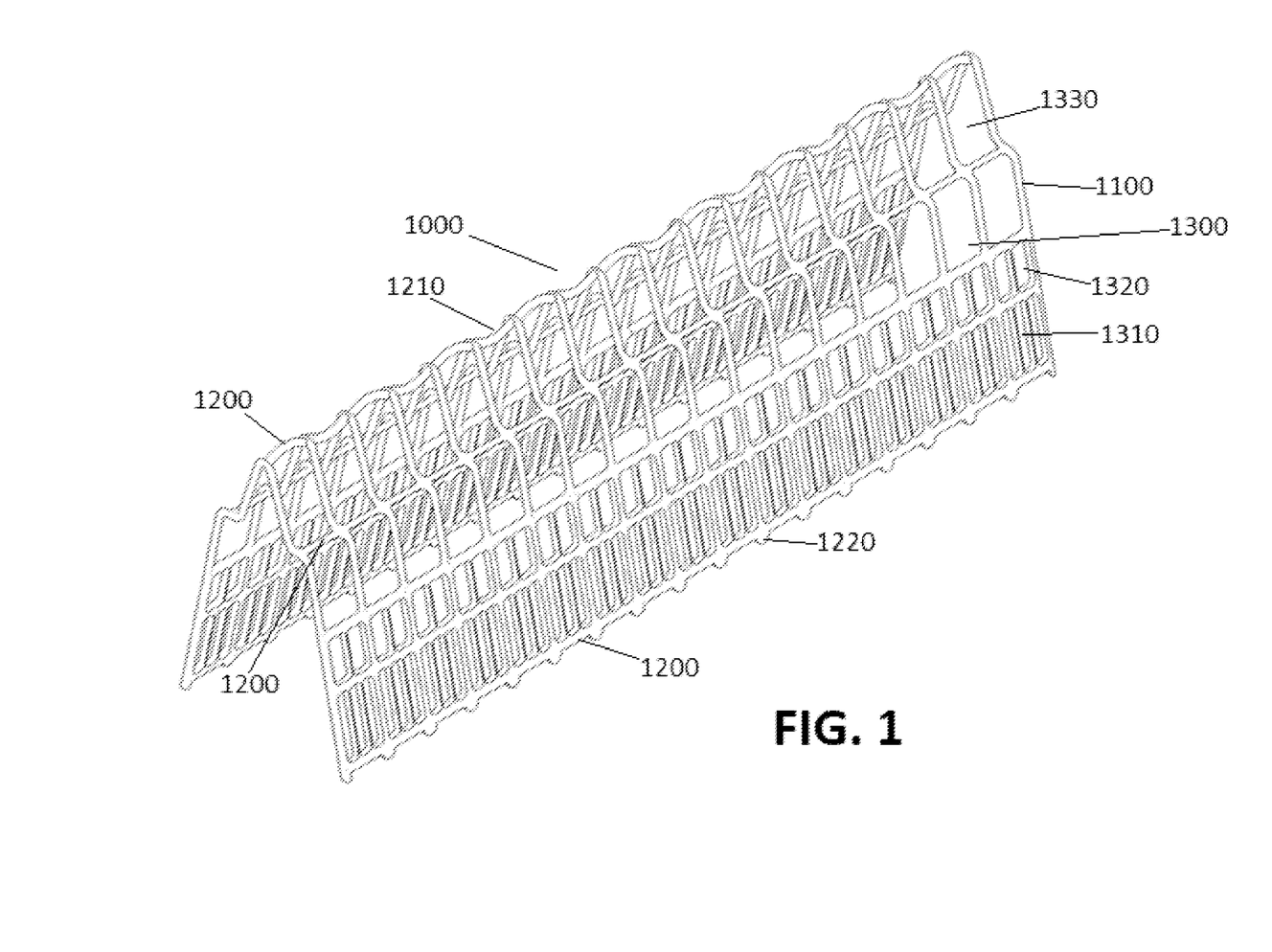
FIG. 1 is a perspective view of the integral bird anti-migration panel of the present invention.

The integral anti-migration panel 1000 is made of plastic or other light materials that do not rust due to the effects of humidity, ammonia or any other chemical.

Figure 2:
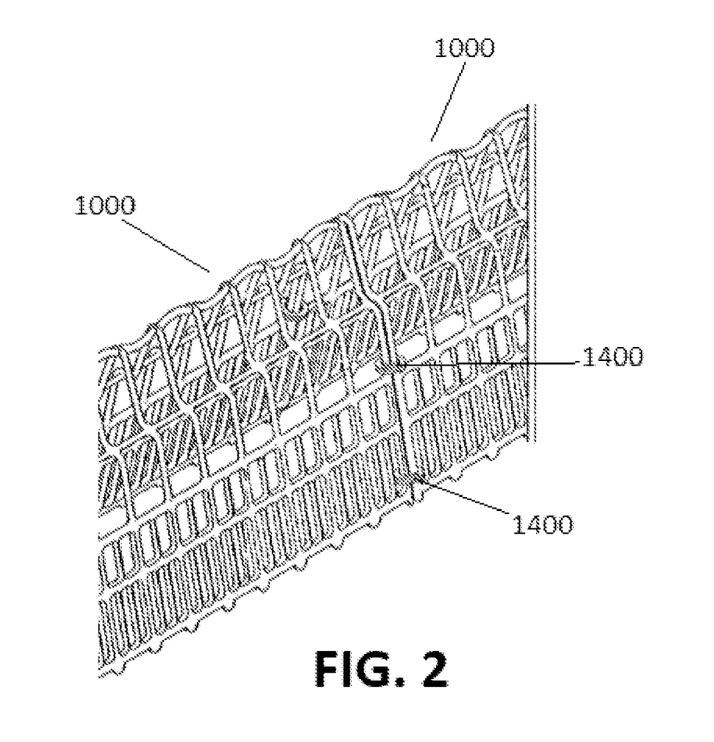
FIG. 2 is a detailed view of the joining of integral bird anti-migration panel s to form an anti-migration barrier.
Figure 4:
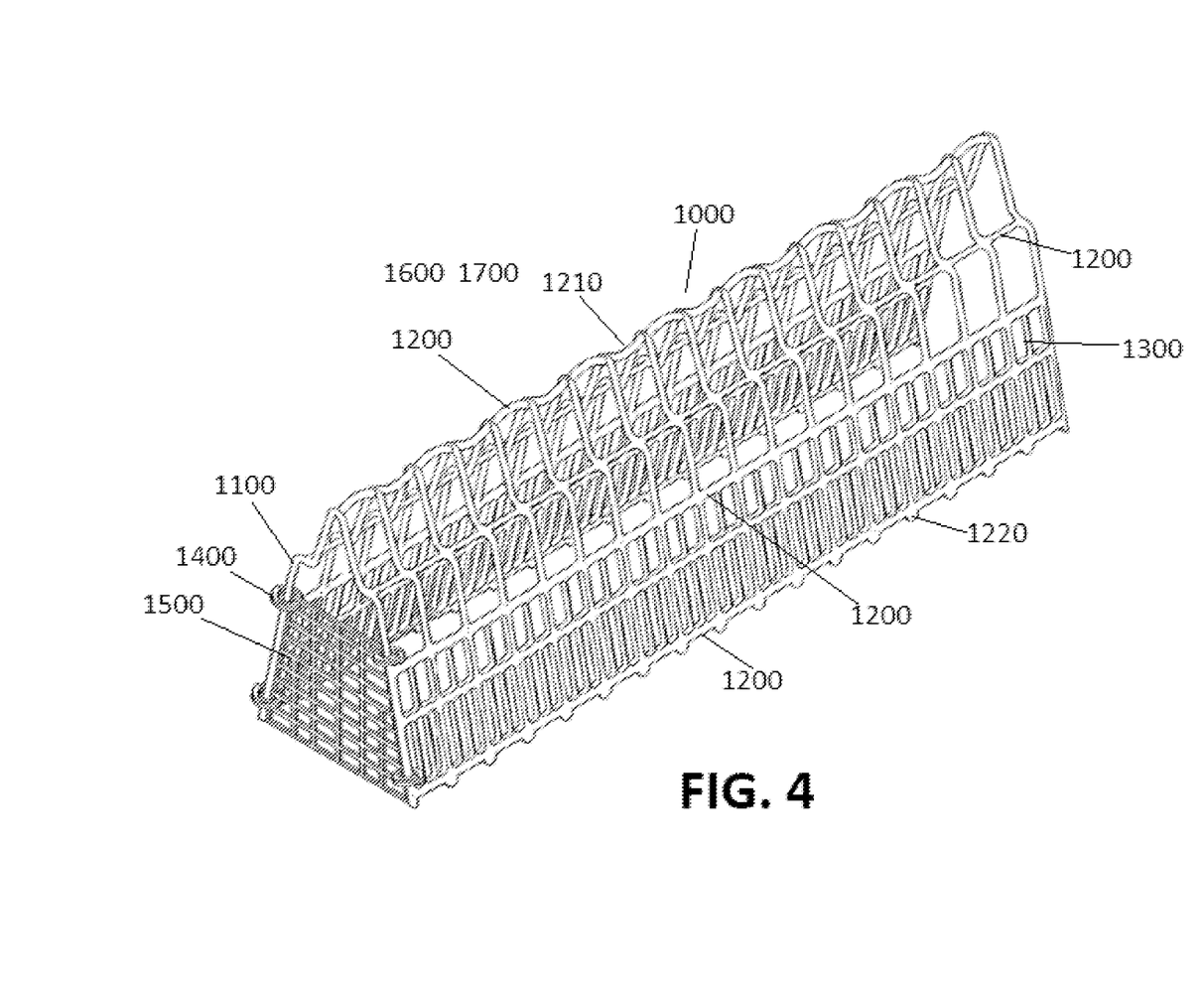
FIG. 4 is a perspective view of the integral bird anti-migration panel of the present invention with the cap secured thereto.

As shown in FIGS. 1, 2 and 4, the plurality of arches 1100 are spaced apart equidistantly from each other and are joined together at their sides by the plurality of cross members 1200 and are integrally attached to said cross members to form a single element. As shown in FIG. 1, the join of said arches 1100 and said crossbars 1200 allows the formation of reticles 1300 of different dimensions.

Referring to FIGS. 1 and 4, it can be seen that the smallest dimension reticle 1300 is located in the lower part of the panel and the largest dimension reticle 1300 is located in the upper part of said integral anti-migration panel 1000, this configuration is designed to prevent chicks or small birds from passing through the panel from one side to the other. The squares are enlarged as they move away from the floor so that at any age of the birds they cannot pass through the integral anti-migration panel 1000. The integral anti-migration panel 1000 is placed since the chickens are small and is removed when the birds finish their production cycle and are removed for slaughter.

The reticles 1300 of different dimensions allow the air to pass through the integral anti-migration panel 1000 without difficulty, that is to say, there is no obstruction for the circulation of the air from one side to the other, which is an important factor, since the integral anti-migration panel 1000 is designed to avoid any air deflection. This allows the refreshing and cooling of the birds with the passing of air.

Referring again to FIGS. 1 and 2, it can be appreciated that the upper crossbar 1200 attached to the upper end of said arches 1100, comprises undulations 1210, which prevents the birds from perching by making uncomfortable the rest thereon, which is different to all the others panels known in the prior art where the upper part is linear and straight favoring the birds to perch on the upper part thereof. Likewise, it can also be appreciated that the lower crossbar 1200 joined to the lower ends of said arches 1100 forms a support base to place the integral anti-migration panel 1000 on the farm floor; likewise, said lower cross member comprises a plurality of projections 1220, which are configured to fix the panel on the ground in the position desired by the user, by burying or inserting said projections 1220 into the ground.

Referring again to FIG. 2, it is appreciated that the attachment between integral anti-migration panels 1000 to form an anti-migration barrier is made by means of joint rings 1400, thus, it is not required placing the panels one on top of the other, which would result in the use of more panels to cover the desired length.

Figure 3:
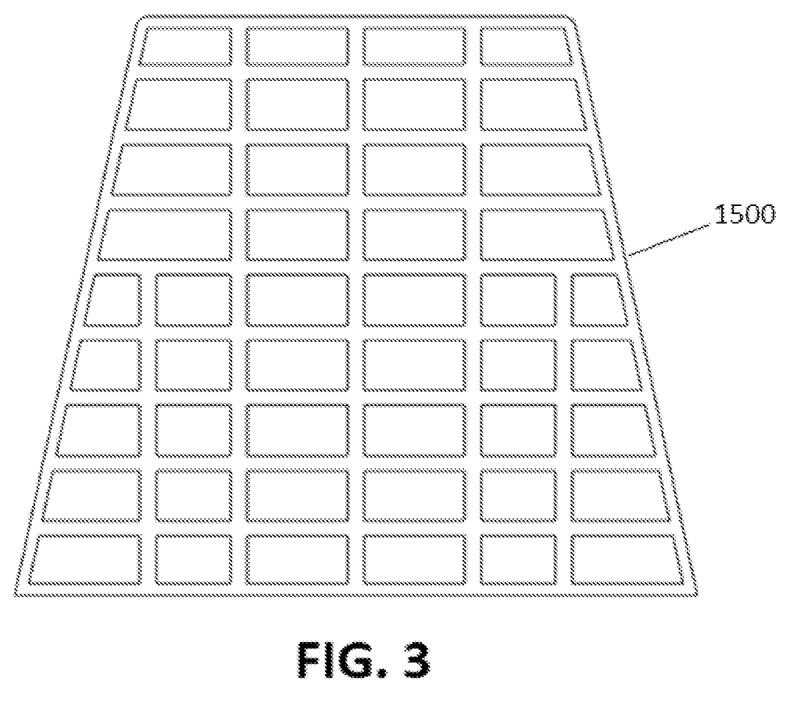
FIG. 3 is a front view of the cap to prevent birds from getting into the integral bird anti-migration panel of the present invention.

Referring to FIGS. 3 and 4, it is shown that the ends of the integral anti-migration panels 1000 that are in contact with the walls, have a cap 1500 to prevent birds from getting inside the panels 1000. Said caps are attached to the panel by means of the joining rings 1400. By placing this element, it can be considered that the barrier is sealed and closed without any open area through which the birds can enter therein.

Figure 5:
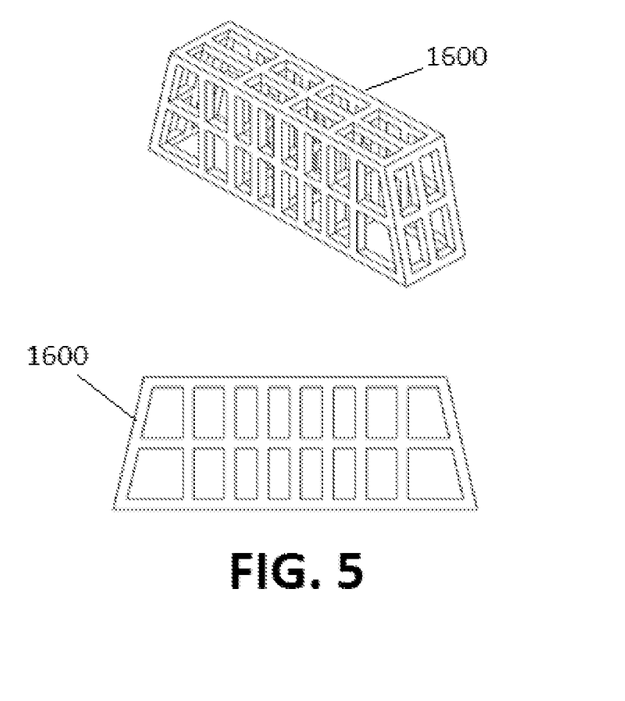
FIG. 5 is a series of perspective and front views of the pyramidal support base that allows the passage and support of the feeders and drinkers.
Figure 6:
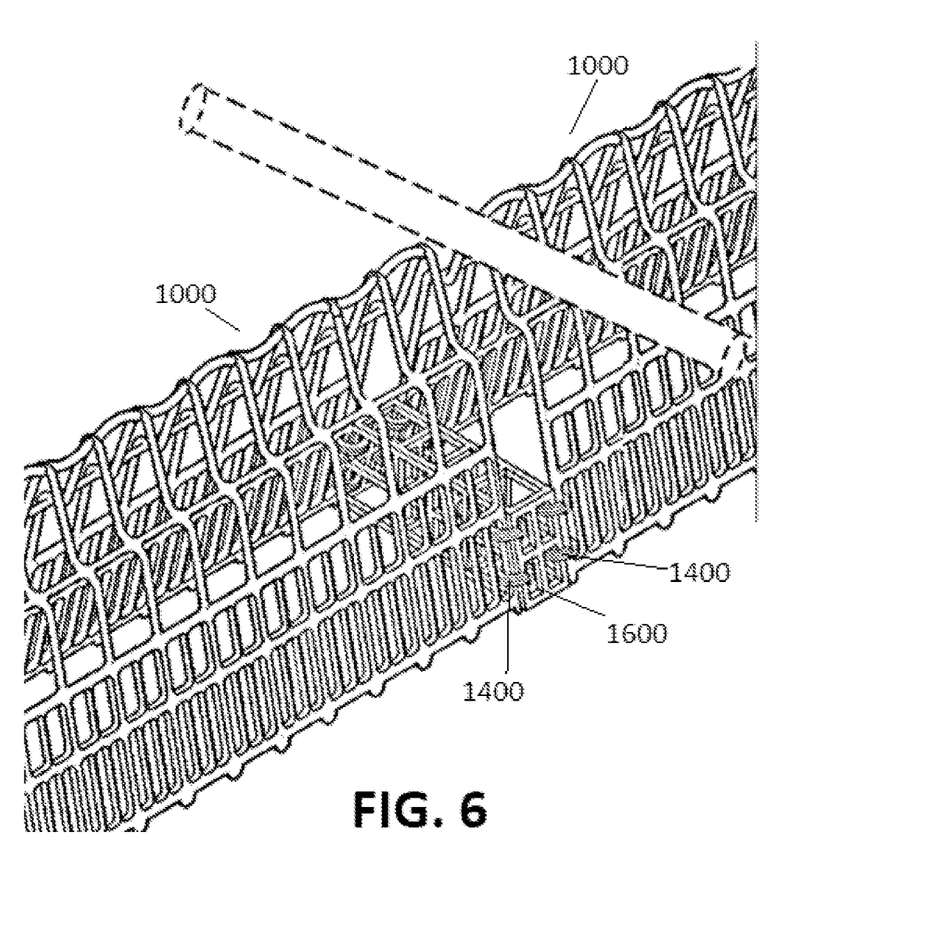
FIG. 6 is a detailed view of the pyramidal support base secured between the integral anti-migration panels.
Figure 7:
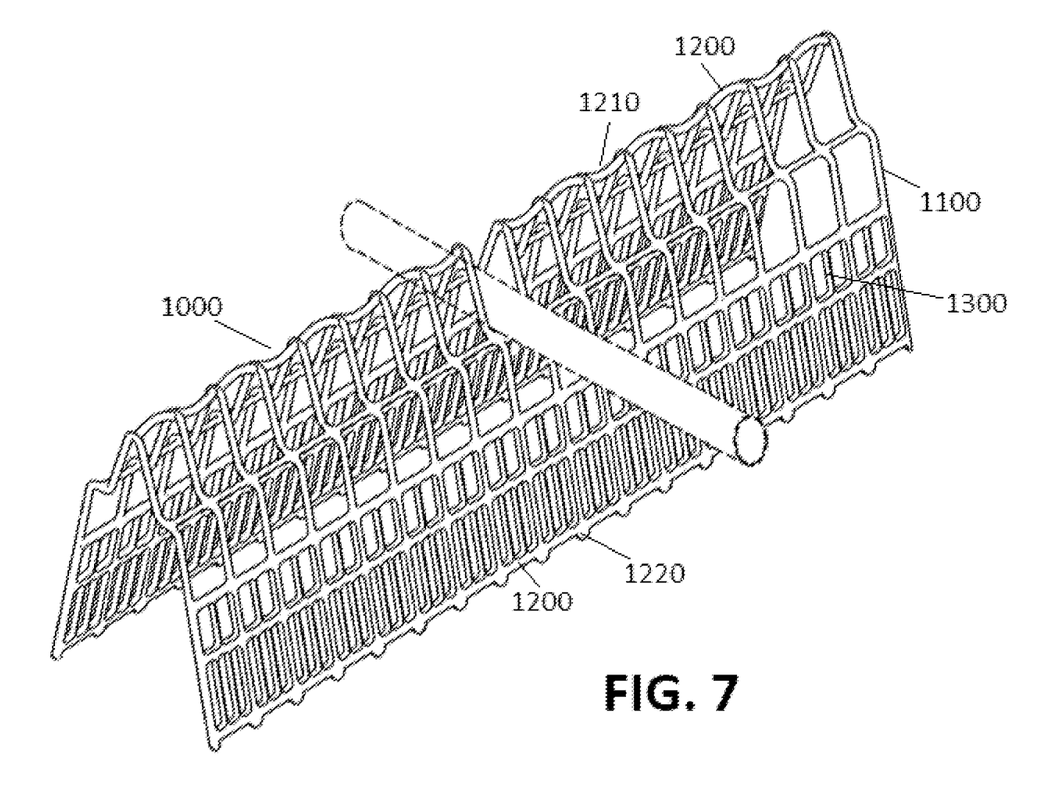
FIG. 7 is a perspective view of the integral bird anti-migration panel to which one of the corrugations has been removed to allow the passage and support of said feeders and drinkers.

As shown in FIGS. 5 and 6, during the formation of the anti-migratory barrier, there is an exception of union between the panels, which is the area where the automatic feeders and automatic nipple-type drinkers pass, wherein for this purpose a pyramidal support base 1500 is placed between the panels, which is attached to the panels by means of joint rings 1400 and allows the passage and support of said feeders and drinkers. Likewise, in case where the passage of the automatic feeders and automatic nipple-type drinkers does not coincide with the union of two integral anti-migration panels 1000, one of the ondulations 1210 of said panel 1000 can be removed to allow the pass and support of said feeders and drinkers, as shown in FIG. 7.

In accordance with the foregoing, it will be evidente for a person skilled in the art that the embodiments of the integral anti-migration panel of the present invention and their respective components described above are presented for illustrative purposes only, since a skilled person can perform numerous variations to the same, as long as they are designed in accordance with the principles of the present invention. As consequence of the previous, the present invention includes all the embodiments that a person skilled in the art may propose from the concepts contained in the present description, in accordance with the following claims.

The invention claimed is:

1. An integral bird anti-migration panel comprising:
   a plurality of arches in a stepped pyramidal shape, spaced apart equidistantly from each other;
   a plurality of crossbars integrally joined to sides of said plurality of arches to form a single element, wherein a union of said plurality of arches and said plurality of crossbars form reticles of different dimensions, wherein a reticle of smaller dimension is located at a bottom of said integral panel and is designed to prevent small birds from entering inside said integral panel and a reticle of largest dimension is located at a top of the integral panel and is designed to prevent large birds from entering into the integral panel;
   wherein an upper crossbar is undulated to prevent perching or resting of the birds thereon; and
   wherein a union of a lower crossbar and lower ends of the plurality of arches forms a support base for the integral panel; and wherein said lower crossbar comprises a plurality of projections, which are configured to be buried in the ground and prevent the integral panel from moving.

2. The integral bird anti-migration panel according to claim 1, wherein said integral panel is made of plastic or other light materials that do not rust due to the effects of humidity, ammonia or any other chemical.

3. The integral bird anti-migration panel according to claim 1, wherein the reticles of different dimensions allow passing of air through the integral panel without difficulty, which allows refreshing or cooling the birds with the passing of air.

4. The integral bird anti-migration panel according to claim 1, wherein plural integral panels are joined by joining rings to form an anti-migration barrier.

5. The integral bird anti-migration panel according to claim 4, wherein a cap is provided at an integral panel positioned at an end of said anti-migration barrier to prevent the birds from getting into the panels, leaving the anti-migration barrier sealed and closed without any open area through which the birds can enter therein.

6. The integral bird anti-migration panel according to claim 5, wherein said caps are attached to the integral panel by the joining rings.

7. The integral bird anti-migration panel according to claim 4, wherein a pyramidal support base is placed between the integral panels and attached to said integral panels by said joint rings in an area where automatic feeders and automatic nipple-type drinkers are provided allowing the passage and support of said automatic feeders and said automatic nipple-type drinkers.

8. The integral bird anti-migration panel according to claim 7, wherein one of the undulations of said integral panel is removed when the passage of said automatic feeders and said automatic nipple-type drinkers does not coincide with a junction of two integral panels to allow the passage and support of said automatic feeders and said automatic nipple-type drinkers.

* * * * *